(12) United States Patent
Lecomte et al.

(10) Patent No.: US 8,177,283 B2
(45) Date of Patent: May 15, 2012

(54) GLASS FOR A VEHICLE DASHBOARD

(75) Inventors: David Lecomte, Saint-Cyr-L'ecole (FR);
Didier Gillet, Saint-Denis (FR)

(73) Assignee: Renault S.A.S., Boulogne-Billancourt (FR)

( * ) Notice: Subject to any disclaimer, the term of this patent is extended or adjusted under 35 U.S.C. 154(b) by 384 days.

(21) Appl. No.: 12/599,900

(22) PCT Filed: Apr. 30, 2008

(86) PCT No.: PCT/FR2008/050775
§ 371 (c)(1),
(2), (4) Date: Nov. 12, 2009

(87) PCT Pub. No.: WO2008/148980
PCT Pub. Date: Dec. 11, 2008

(65) Prior Publication Data
US 2012/0007381 A1    Jan. 12, 2012

(30) Foreign Application Priority Data
May 14, 2007  (FR) ...................................... 07 55047

(51) Int. Cl.
*B62D 25/14*    (2006.01)
*B60K 37/02*    (2006.01)

(52) U.S. Cl. ........................................... 296/70; 180/90
(58) Field of Classification Search ................... 296/70; 180/90
See application file for complete search history.

(56) References Cited

U.S. PATENT DOCUMENTS

| 5,291,338 | A   | * | 3/1994 | Bezard et al. ................. 359/859 |
| 7,914,147 | B2  | * | 3/2011 | Sharifzadeh et al. ......... 351/213 |
| 2004/0189483 | A1 |  | 9/2004 | Stringfellow |

FOREIGN PATENT DOCUMENTS

| EP | 0482805 | 4/1992 |
| FR | 2721865 | 1/1996 |

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A curved glass for a motor vehicle dashboard including a mechanism positioning the glass with respect to the dashboard of the vehicle and with respect to a reference point representing an upper observation point. A reference axis to be vertical when the glass is assembled on the vehicle includes the reference point. The glass includes a main portion having partially elliptical sections in vertical cross-sectional planes including the reference axis. Each of the elliptical sections has a first focus situated at the reference point of the glass.

10 Claims, 5 Drawing Sheets

GLASS FOR A VEHICLE DASHBOARD

The invention relates to the field of motor vehicle dashboard glasses. In particular, the invention relates to the field of instrument cluster glasses covering several instruments placed in the dashboard, such as speed indicators, rev counters, etc.

In general, dashboards are provided with a visor above the instruments, which protects the driver from sunlight reflections that the glass could direct back to the driver.

Certain visors are called "closed" visors. These protrude toward the driver not only above the instruments but also on the sides. They are effective against reflections. Other visors are called "open" visors. They have the advantage of allowing the dashboard instruments to be seen from the other seats of the vehicle. However, it is particularly difficult to ensure that no sunlight is reflected back to the driver in the case of an open visor.

U.S. Pat. No. 5,997,161 (General Motors Corporation) describes a dashboard provided with an aspherical instrument cluster glass, the overall concavity of which is turned toward the bottom of the vehicle. This has the drawback that the observer's eyes perceive an image of the dashboard instruments via light rays that pass through said glass at practically grazing incidence. This distorts the image perceived by the driver.

Patent application FR 2 721 865 (Renault) describes a dashboard provided with a display, the image of which is reflected onto the dashboard glass. The glass has a frustoconical shape.

The invention proposes a curved glass for a dashboard, a dashboard provided with said glass and a method of defining a curve of the glass which deals with the likelihood of the glass having reflections back to the driver, especially in the case of an open visor.

According to one embodiment, the curved glass for a motor vehicle dashboard comprises a means for positioning the glass with respect to the dashboard of the vehicle and with respect to a reference point representative of a high observation point. A reference axis, intended to be vertical when the glass has been fitted onto the vehicle, contains the reference point. The glass comprises a main portion having partially elliptical sections in vertical section planes containing the reference axis. Each of the elliptical sections has a first focus located at the reference point of the glass.

The rays reflected onto the glass and reaching the high observation point propagate in one of the section planes containing the reference axis. A reflected ray comes from an incident ray, the projection of which on the section plane can come only from a zone close to a second focus of the elliptical section. In addition, since drivers have their eyes above the dashboard in order to see the road, the two foci of the ellipse are above the glass. Since the reference point of the glass is above the eyes of potential drivers, the incident rays, likely to rejoin the eyes of a driver, are more to the front than those that are reflected toward the reference point, and therefore to the front of the second focus of the elliptical section. The elliptical shape of the main portion of the glass deals with the incident rays likely to be reflected toward the driver's eyes, enabling them to be intercepted by a visor.

In addition, since the concavity of the glass is upwardly directed, the rays passing through the glass toward the driver's eyes are closer to the normal to the glass than in a glass having a downwardly directed concavity. The image transmitted by the glass is less distorted.

According to another embodiment, the normals to the surface of the main portion on the passenger compartment side are oriented laterally with respect to the section plane toward a median front half-plane, the median front half-plane being bounded by and containing the reference axis and being located toward the front of the vehicle when the glass has been fitted onto the vehicle.

In other words, seen from above, in projection on a horizontal plane, rays reflected by the glass onto the reference point are less inclined to the median plane of the glass than the corresponding incident rays. This makes it possible to reduce the likelihood of the glass having reflections. In other words, a visor masking the reflections on the glass can be smaller in size.

According to yet another embodiment, the elliptical sections are each tangential to a template having a surface of revolution about a template axis, parallel to the reference axis and located in a median rear half-plane, the median rear half-plane being bounded by and containing the reference axis and being located toward the rear of the vehicle when the glass has been fitted onto the vehicle.

Thanks to the curvature of the template about the template axis, the glass has sections in a horizontal plane that also have a certain curvature on either side of the median plane. The normals to the glass at the points of incidence are directed toward the median plane. This makes it possible to modify the convergence of the reflected beam and to act on the reflections perceived by the driver.

Advantageously, the template is a cone.

Advantageously, the template axis is coincident with the reference axis.

According to another embodiment, the glass comprises an adjoining secondary portion tangentially continuous with the main portion and in which the adjoining secondary portion is inclined at an angle to the vertical greater than a threshold.

In other words, the ellipse portion running the risk of being too vertical has been eliminated and replaced with the secondary portion. This makes it possible for the interception of the incident rays likely to be reflected onto the reference point not to be too grazing relative to the visor. This prevents a driver looking below the visor from seeing himself in the upper part of the glass. In general, this eliminates spurious reflections and makes it possible to continue to suppress reflections despite a certain tolerance in relative positioning between the visor and the glass.

According to another aspect, the invention relates to a motor vehicle dashboard provided with a glass and with a visor at least partly located above the glass, in which the elliptical sections each have a second focus located on an undersurface of the visor.

According to another embodiment, the elliptical sections each have a second focus located at the height of a median extreme edge of the visor and radially further away from the reference axis than said median extreme edge.

This makes it possible to accentuate the ellipticity of the lateral elliptical sections located on the external sides of the glass with respect to the median plane. This accentuates the curvature of the horizontal sections of the glass toward the lateral sides of the glass. This makes it possible to control the incident rays likely to reach the high observation point and enables them to be masked with a suitable visor. Conversely, this makes it possible to adapt the glass to a given visor.

According to yet another aspect of the invention, this relates to a method of defining a curve for a motor vehicle dashboard glass, comprising a step of constructing a family of ellipses in vertical planes containing a high observation point of the driver, each of the ellipses having the high observation point as focus and a step of joining the surfaces of the principal portions of each of the ellipses.

According to another embodiment, the method is suitable for adapting the glass to a given visor of a dashboard. The step of constructing the family of ellipses comprises a step of defining an overall template of the family of ellipses, to which template each ellipse is tangential, and a step of positioning the second foci of each ellipse on an undersurface of said visor.

For an incident ray not masked by the visor, it is possible to modify the normal to the point of incidence so that the reflected ray cannot reach the eyes of a driver. By modifying the second focus of the ellipse it is possible to modify the normal to the point of incidence seen in the section plane. By modifying the curvature of the template it is possible to modify the normal to the point of incidence seen in a horizontal plane. Thanks to the two degrees of freedom afforded by the choice of the position of the second focus and the choice of the position of the template axis, it is possible to adapt the glass to the visor even if this is of the open visor type.

Other features and advantages of the invention will become apparent on reading the detailed description of a few embodiments taken as nonlimiting examples and illustrated by the appended drawings, in which.

Figure 1:
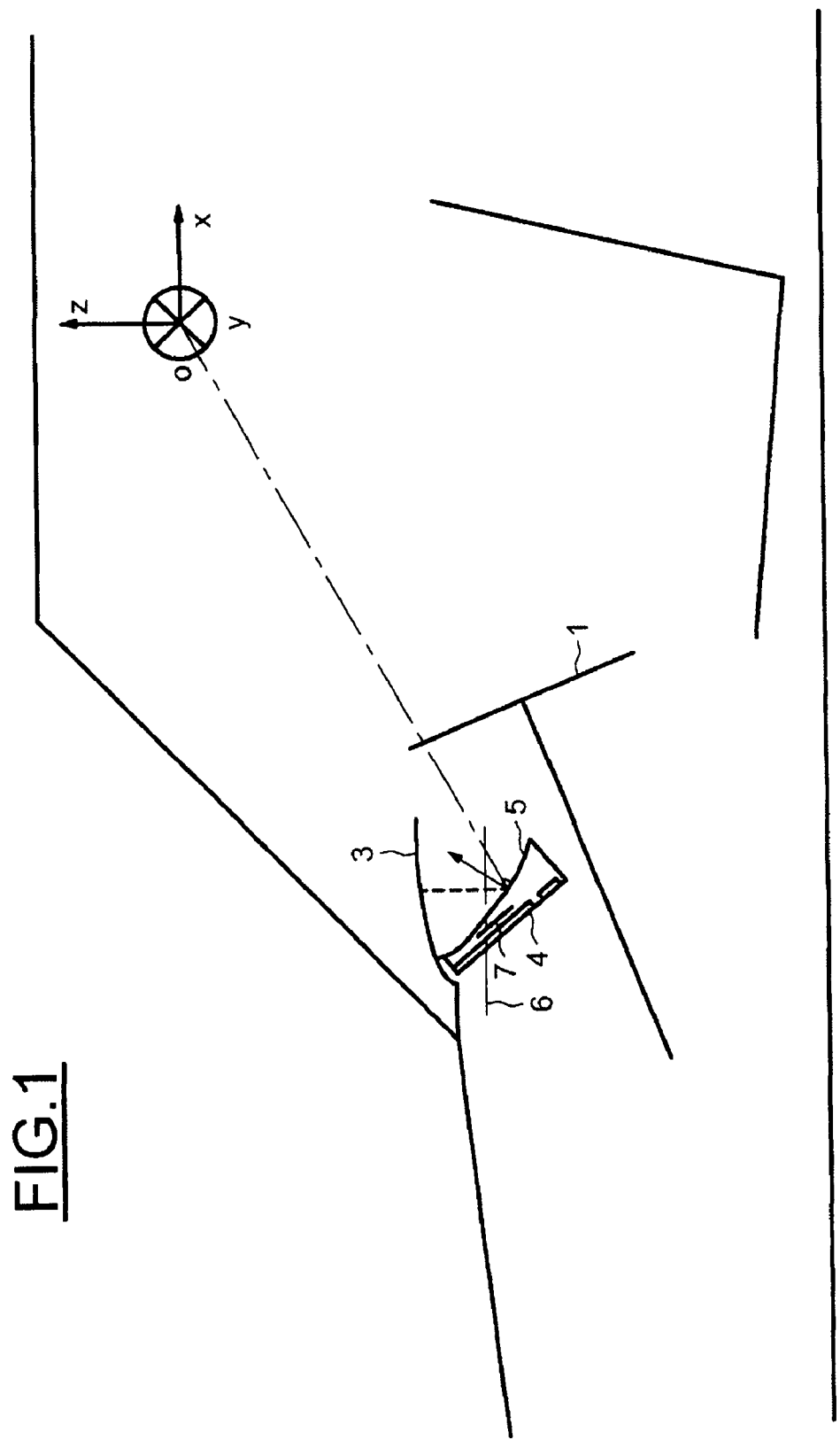
FIGS. 1 and 2 are illustrations of a dashboard and a high observation point in a vehicle.
Figure 2:
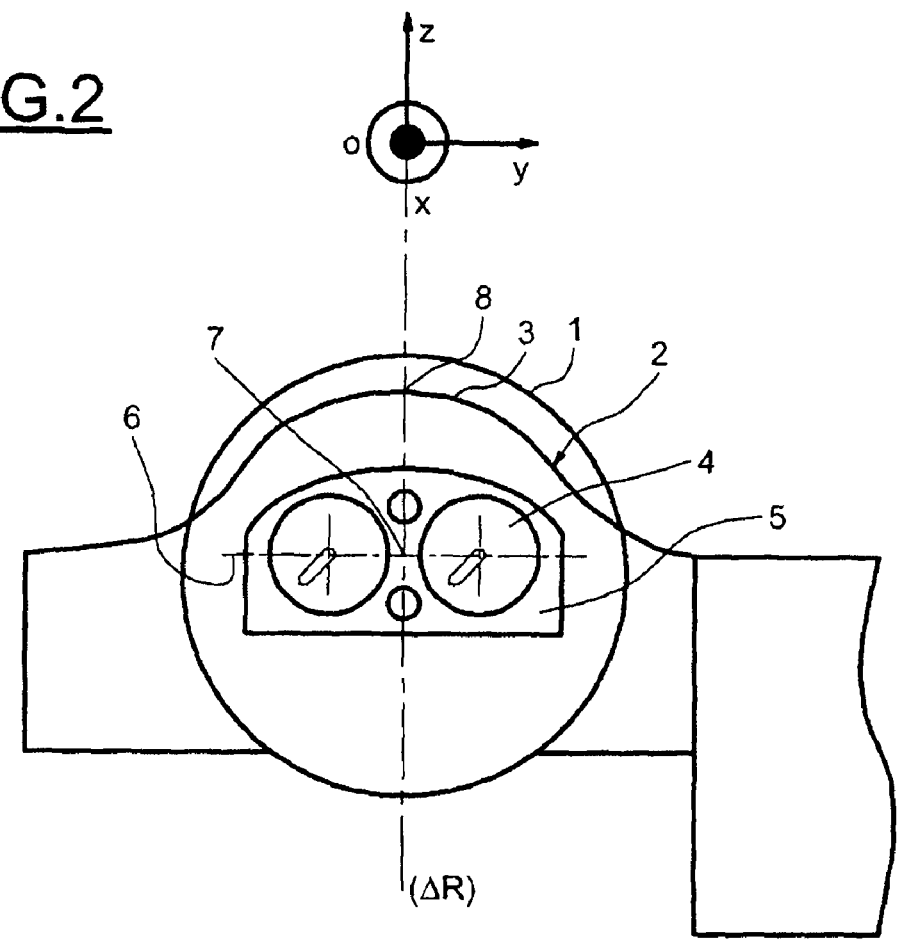

As illustrated in FIGS. 1 and 2, the vehicle comprises, above the steering wheel 1, a dashboard 2 having a visor 3, counters 4 and an instrument cluster glass 5 covering all the counters 4. A horizontal plane passes through the center 7 of a counter. The reference coordinate system (Oxyz) contains, at its origin, a point O located at the maximum height that the eyes of a specimen representing the driver are likely to occupy. The plane (xOz) is a vertical longitudinal located laterally at the middle of a driving station. The axis (Ox) is horizontal, lying in the axis of the vehicle toward the rear of the vehicle. The axis (Oy) is horizontal, transverse to the vehicle and directed toward the right of the vehicle, and the axis (Oz) is vertical, passing through the reference point O. The axis (Oz) is the reference axis (Oz) serving to construct the glass 5 of the dashboard 2. The point O of the reference coordinate system is located on the vehicle between 30 cm and 40 cm, preferably about 34 cm, above the center 7 of the counter 4 and between 60 cm and 110 cm, preferably between 72 cm and 83 cm, to the rear of the center 7.

Figure 3:
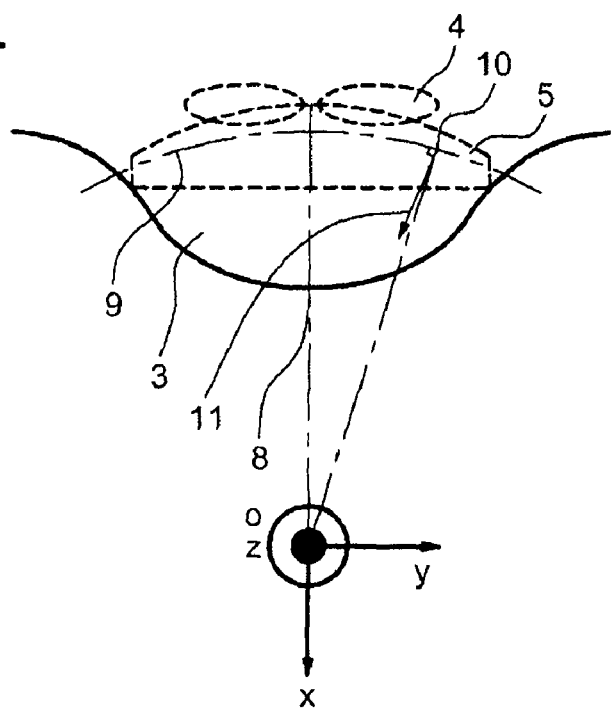
FIG. 3 is a top view of a dashboard visor.

As illustrated in FIG. 3, the visor 3 extends over the top of the instrument cluster glass 5 and the counters 4, and has a median extreme edge 8 located as close as possible to the driver in the median plane (xOz). The instrument cluster glass 5 is illustrated by the dotted lines, as are the counters 4.

A dot-dash line illustrates a horizontal section 9 of the glass 5 in the horizontal plane 6. The glass 5 has a normal 11 to the location of a point 10 on the horizontal section 9. One of the objectives of the invention is to determine the curvature of the glass 5 in such a way that no light ray can reach the point 10 with an angle of incidence such that it can be reflected toward the point O and cause a reflection on the glass that would disturb the driver. The incident rays may come from sunlight, but also from any point in the passenger compartment or from the driver likely to reflect the light toward the dashboard 2.

Figure 4:
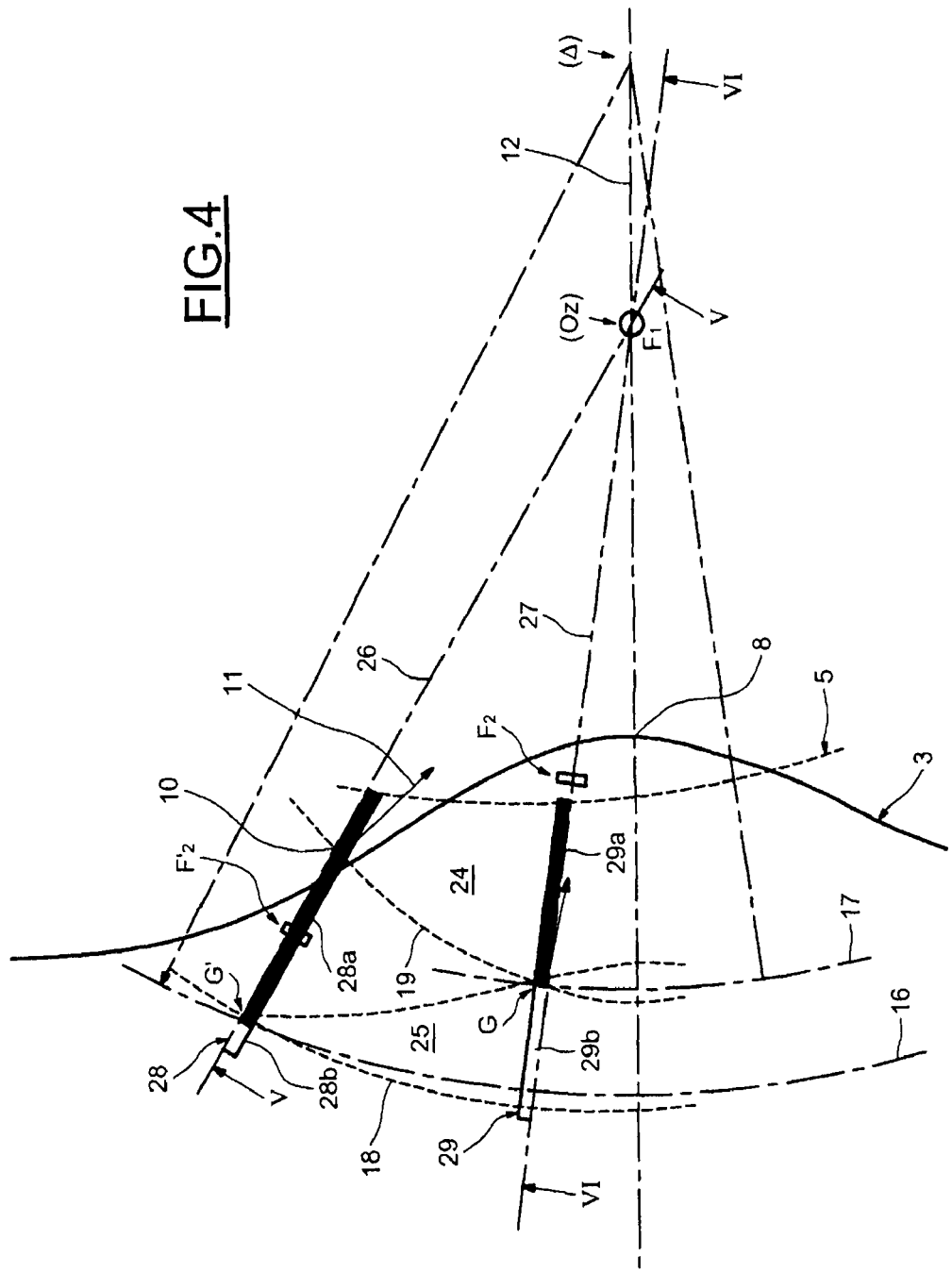
FIG. 4 is a top-view engineering drawing that defines the curvature of the glass according to the invention.

A method for defining the curvature of the glass 5 will now be described with the aid of FIGS. 4 to 6. The references described above also apply to these figures. FIG. 4 illustrates three vertical section planes containing the reference axis (Oz). The median plane (xOz) corresponds to a plane of symmetry of the glass 5. The plane V-V is a section plane 26 located angularly to the outside of the glass 5 and of the visor 3. The plane VI-VI is also a section plane 27 located angularly close to the median plane (xOz).

The glass 5 has a section 28 in the section plane 26 and a section 29 in the section plane 27. The sections 28 and 29 are represented by a rectangle, the blackened parts of which illustrate elliptical portions 28a and 29a and the white parts of which illustrate rectilinear portions 28b and 29b.

An axis ($\Delta$), parallel to the reference axis (O), is located in a median rear half-plane 12. A template 13 has a conical shape about the template axis ($\Delta$) and an apex angle corresponding to the angle of inclination of the counter 4, as illustrated in FIG. 6.

Figure 5:
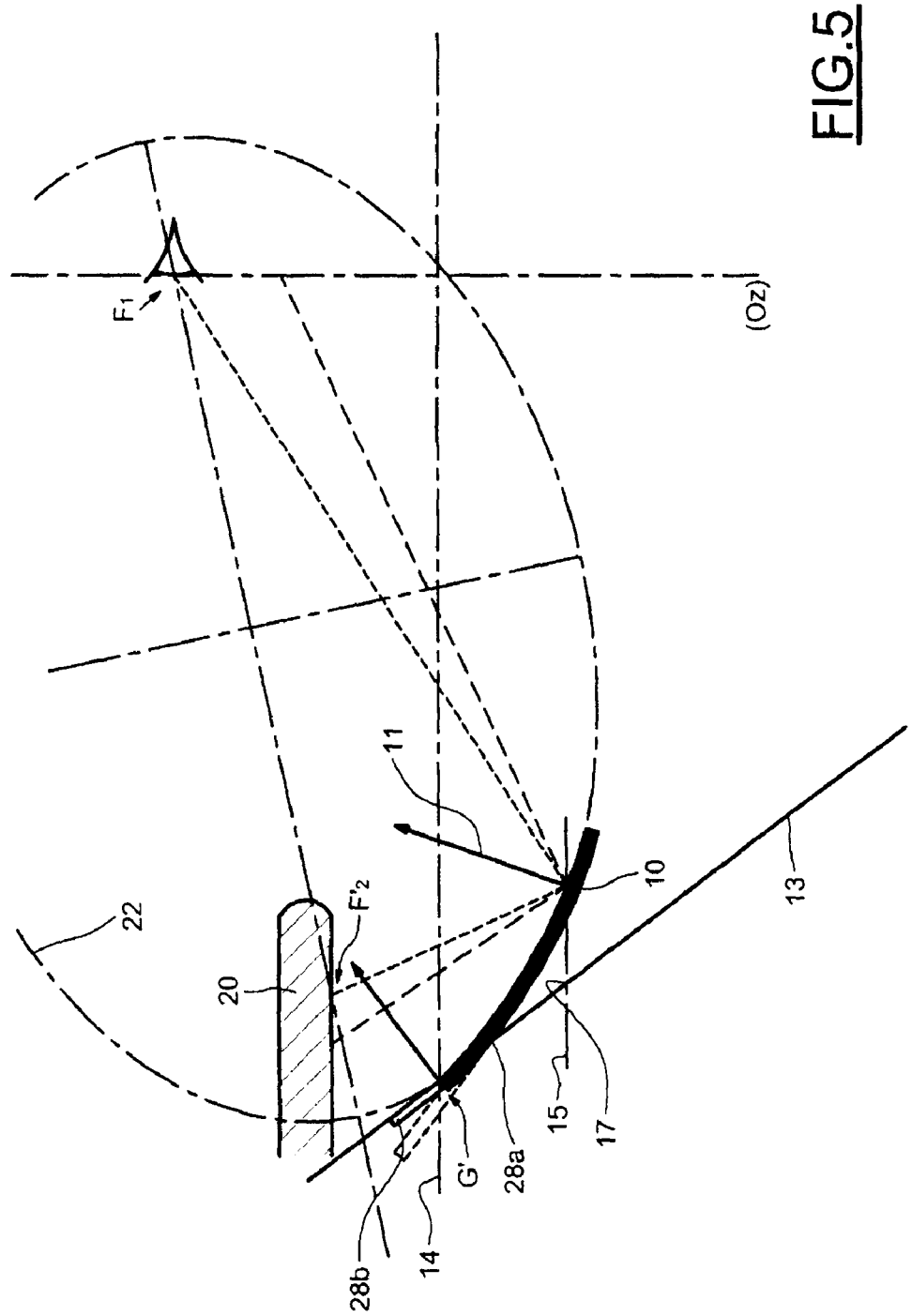
FIG. 5 is an engineering drawing in cross section on the plane V-V of FIG. 4.
Figure 6:
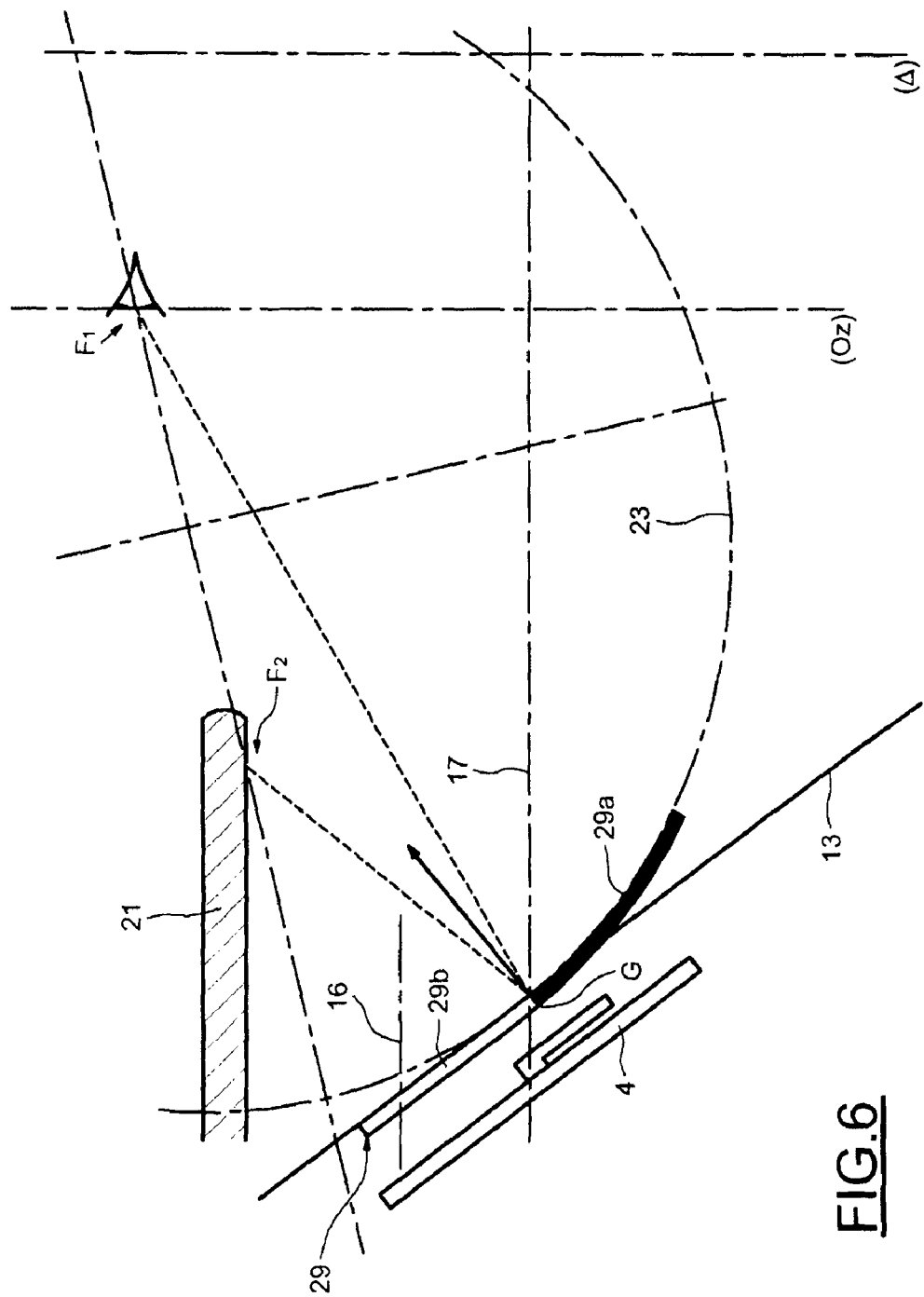
FIG. 6 is an engineering drawing in cross section on the plane VI-VI of FIG. 4.

A first section plane 14 and a second section plane 15 are horizontal, these being visible in FIGS. 5 and 6. The fine dot-dash circular arcs of FIG. 4 illustrate the sections 16 and 17 of the template 13 respectively in the first section plane 14 and the second section plane 15. The dotted lines 18, 19 illustrate the sections of the glass 5 in the first section plane 14 and the second section plane 15 respectively.

As illustrated in FIG. 5, the visor 3 has a section 20 in the plane 26 which may be located at a different height from the section 21 in the plane 27. A first focus $F_1$ is located at the reference point O of the glass, representative of a high observation point. A second focus $F'_2$ is positioned on the undersurface of the section 20. An ellipse 22 is defined by the first and second foci $F_1$ and $F'_2$ and by the fact that the ellipse 22 is tangential to the cone of the template 13. The point G' is the point of tangency between the ellipse 22 and the template 13.

In another embodiment, the boundary between the elliptical part 28a and the rectilinear part 28b corresponds to the point G' for constructing the ellipse 22.

In another embodiment, it would be possible for the rectilinear part 28b not to be coincident with the cone of the template 13, but could be more inclined to the vertical. The transition between the elliptical part 18a and the rectilinear part 18b would then not be coincident with the point G' for constructing the ellipse 22, as illustrated by the dotted lines in FIG. 5. This embodiment makes it possible to reduce the curvature in the upper part of the glass 5 in a place well protected by the visor 3 and to reduce the size at this place of the assembly comprising the counter 4 and the glass 5.

According to one or other of the above embodiments, the manner of constructing the ellipse 22 makes it possible to ensure that the light rays reaching the high observation point can come only from an incident ray, the projection of which on the section plane 26 emanates from the point $F'_2$, as illustrated by the short dotted lines in FIG. 5. The long dotted lines in FIG. 5 illustrate the case of a light ray likely to encounter the eyes of a smaller driver. In this case, the corresponding incident beam has a projection on the plane 26, the origin of which is to the front of the point $F'_2$.

As illustrated in FIG. 6, an ellipse 23 is constructed in the same manner as the ellipse 22, by defining a point $F_2$ on an undersurface of the section 21 of the visor 3. The ellipse 23 has, as focus, the first focus $F_1$ common to all the ellipses, and the focus $F_2$ is tangential to the template cone 13. The rectilinear portion 29b is an extension in the plane 27 from the point G of tangency of the elliptical portion 29a.

In the case of a vehicle having a horizontal dashboard 2, the sections 20 and 21 could be identical, and likewise the length of protrusion of the visor above the counter 4 could also be identical. In both cases, the second focus $F_2$ or $F'_2$ is determined close to the end of the corresponding section 20 or 21.

Both elliptical portions 28a and 29a are numerically joined together and form a main portion 24 of the glass 5. Both rectilinear portions 28b and 29b are numerically joined together and form a secondary portion 25 of the glass 5. In this way, the glass makes, at all points, an angle to the vertical greater than a threshold angle. This angle allows the visor 3 to continue to mask the reflections on the glass 5 despite the tolerance in angular positioning of the glass 5 with respect to the visor 3. This positioning tolerance may be extensive, since in general the glass 5 is fixed to the counter 4, which is itself fixed to a chassis, whereas the dashboard 2 is fixed directly to the vehicle.

FIG. 4 serves to illustrate an advantage of this method of defining the curvature of the glass 5. For a given vehicle, the position of the reference axis (Oz) is fixed and the shape of the visor 3 is also fixed. The only degrees of freedom for determining the curvature are the fixing of the distance between the template axis Δ and the reference axis (Oz) and the fixing for each section plane of the position of the second foci $F_2$ and $F'_2$. When the angle of the section plane to the median plane (xOz) increases, the distance between the first and second foci also increases. This has the effect of accentuating the ellipticity of the ellipses located on the outer lateral edges of the glass 5. This increases the horizontal radius of curvature of the section 17 located in a lower part of the glass 5 relative to the radius of curvature of the section 16 located in a high part of the glass 5.

The normal 11 to the point of incidence 10 makes an angle to the corresponding plane of section oriented toward the median part of the glass 5 in such a way that the beams likely to rejoin the first focus $F_1$ are intercepted by the visor 3 even if the visor 3 is not immediately above the point of incidence 10 in question. This makes it possible to mask the reflections on the glass 5 of a dashboard 2, even with a very open visor 3 of small dimensions.

The invention claimed is:

1. A curved glass for a motor vehicle dashboard including a mechanism positioning the glass with respect to the dashboard of the vehicle and with respect to a reference point representative of a high observation point, a reference axis, to be vertical when the glass has been fitted onto the vehicle, containing the reference point, the curved glass comprising:
    a main portion including partially elliptical sections in vertical section planes containing the reference axis, each of the elliptical sections having a first focus located at the reference point of the glass.

2. The glass as claimed in claim 1, in which normals to the surface of the main portion on a passenger compartment side are oriented laterally with respect to the section plane toward a median front half-plane, the median front half-plane being bounded by and containing the reference axis and being located toward the front of the vehicle when the glass has been fitted onto the vehicle.

3. The glass as claimed in claim 1, in which elliptical sections are each tangential to a template having a surface of revolution about a template axis, parallel to the reference axis and located in a median rear half-plane, the median rear half-plane being bounded by and containing the reference axis and being located toward the rear of the vehicle when the glass has been fitted onto the vehicle.

4. The glass as claimed in claim 3, in which the template is a cone.

5. The glass as claimed in claim 3, in which the template axis is coincident with the reference axis.

6. The glass as claimed in claim 1, further comprising an adjoining secondary portion tangentially continuous with the main portion and in which the adjoining secondary portion is inclined at an angle to the vertical greater than a threshold.

7. A motor vehicle dashboard comprising:
    a glass as claimed in claim 1; and
    a visor at least partly located above the glass,
    wherein the elliptical sections each have a second focus located on an undersurface of the visor.

8. A motor vehicle dashboard comprising:
    a glass as claimed in claim 1; and
    a visor at least partly located above the glass,
    wherein the elliptical sections each have a second focus located at the height of a median extreme edge of the visor and radially further away from the reference axis than the median extreme edge.

9. A method of defining a curve for a motor vehicle dashboard glass, comprising:
    constructing a family of ellipses in vertical planes containing a high observation point of the driver, each of the ellipses having the high observation point as focus; and
    joining the surfaces of the elliptical portions of each of the ellipses.

10. The method as claimed in claim 9, for adapting the glass to a given visor of a dashboard, in which the constructing the family of ellipses comprises defining an overall template of the family of ellipses, to which template each ellipse is tangential, and positioning the second foci of each ellipse on an undersurface of the visor.

* * * * *